Patented June 22, 1943

2,322,333

UNITED STATES PATENT OFFICE 2,322,333

IMPROVING FASTNESS OF DYEINGS

Gustave Widmer, Basel, and Andreas Ruperti, Arlesheim, Switzerland, assignors, by mesne assignments, to Ciba Products Corporation, Dover, Del., a corporation of Delaware No Drawing. Application June 27, 1939, Serial No. 281,492. In Switzerland July 4, 1938

3 Claims. (Cl. 8—74)

This invention refers to a process for the improvement of the fastness properties of dyeings or prints on textiles by a treatment with aldehyde condensation products, and it comprises the process of improving said textiles and the improved textiles themselves.

It is known that the fastness to water, especially the fastness to washing of dyeings on natural or artificial cellulose fibers, as well as on animal fibers may be improved by after-treatment with aldehyde-condensation-products capable of hardening. Such a process is described for example for aldehyde-condensation products of the carbamide series in British Patent No. 429,209 and for aldehyde-condensation products of the aminotriazine series in British Patent No. 482,345. It has been explained in both these patents that products of various condensation stages may be used. However, in British Patent No. 429,209 it has been pointed out that the use of high stages of condensation is a disadvantage since there is the danger that the goods treated may be unfavorably affected in respect of their textile properties (see page 2, lines 6–11 of said patent). Also in British Patent No. 482,345 it is stated that in most cases the low condensation stages of the type of methylol-2.4.6-triamino-1.3.5-triazine which are very easily soluble in water are the most suitable products since they can be very easily applied to the material to be treated (see page 1, lines 50–59 of said patent). From the examples of the two patents it is apparent that only the initial condensation products which are soluble without limit in water are used. Furthermore it appears from the examples in the two patents that the dyeings are always treated in baths containing per litre between 50 and 150 grams of condensation product since only by the use of this comparatively high concentration is a sufficient improvement of fastness available.

Hyrophobe condensation products have been used with advantage for producing stiffening, but have proved less suitable for use on textiles which are to retain a normal feel.

The present invention is based on the surprising observation that for enhancing the fastness of dyeings the comparatively highly condensed hydrophobic aldehyde-condensation products are much better suited than are the hydrophilic products, provided that they are used in a concentration less than 5 per cent. calculated on the treating liquor since otherwise the feel of the textiles suffers.

This observation is the more surprising in view of the fact that in general the affinity of condensation products for dyestuffs diminishes with increasing stages of condensation. It was therefore not to be supposed that for the after-treatment of dyeings for the purpose of improving their fastness to water, washing, perspiration, fulling, acid cross dyeing and the like (an operation which may be regarded as the fixing of the dyeings), the hydrophobic products as agents for fixing the dyeings would yield effects which are better than those produced by means of hydrophilic products.

The use of comparatively low concentration of the solutions of hydrophobic condensation products involves the following advantages.

(1) Better fastness is achieved than when more highly concentrated solutions of hydrophilic products are used.

(2) The process is cheaper since a smaller quantity of chemicals is used.

(3) The condensation necessary for fixing the dyeings on the fiber may occur under much more mild conditions when highly precondensed products are used, for example lower temperatures for hardening may be applied and indeed hardening by drying under normal conditions may be substituted for the heat treatment.

The last named advantage is particularly important for products which consist or contain animal fibers, for instance wool or natural silk, since for such materials high temperatures are injurious.

The after-treatment for the direct improvement of the fastness of dyeings in products which consist on the one hand of vegetable fibers, for instance cotton, linen, hemp, staple fiber, artificial silk or the like and on the other hand of animal fibers like wool, silk, camel hair, cow hair, horse hair, hare fur, artificial products such as casein wool or animalised fibers is especially interesting since it is possible to fix dyeings obtained by a simple one-bath process fast to washing, whereas formerly the like fastness could only be obtained by separate dyeings of the two kinds of fiber before they are made up, or by the use of a complicated dyeing process. But also the after-treatment of dyeings on pure vegetable material or of artificial silk with solutions of hydrophobic condensation products is in many cases of great practical importance since dyeing methods more simple and cheaper than those hitherto used may be applied.

The hydrophobic formaldehyde-condensation products of the aminotriazines, especially of melamine have proved particularly suitable for the process of this invention. However, the hydrophobic aldehyde-condensation products of other bodies such as urea, thiourea, guanidine, dicyandiamide, biuret, phenol and the like, as well as derivatives or substitution products or mixtures of these bodies may be used with advantage in the invention, insofar as they are in themselves suitable for the after-treatment of dyeings or prints. The term hydrophobic condensation products is intended to include those products which on the one hand have lost their unlimited solubility in water by further condensation of the hydrophil phase and on the other hand have not become hardened; the products are however not entirely insoluble in water, as will be apparent from the specific examples which follow, but are characterized by solubility in but limited quantities of water.

The dyeings or prints which may be subjected to the after-treatment of the invention may be on any fibrous material or other natural or artificial material be it of vegetable, animal or mineral origin, and in any form and at any stage of its production. Examples are cotton, linen, hemp, paper, wood, wool, silk, leather, felts, feathers, artificial silk, staple fiber, casein wool, sheets of a cellulose basis and the like. The results obtained by after-treatment of dyeings produced by means of substantive cotton dyestuffs are of special interest, but dyeings of other classes of dyestuffs, for instance diazotization-dyestuffs, acid dyestuffs or mordant dyestuffs may with advantage be improved by the after-treatment in respect of their fastness. Since the hydrophobic condensation products are of only limited solubility in cold water of neutral reaction, it is advantageous to use an alkaline or an acid solution according to the nature of the product in question. However solutions in hot water or in organic solvents may also be used.

The following examples illustrate the invention, the parts being by weight:

Example 1

A mixed fabric consisting of 70 per cent wool and 30 per cent viscose staple fiber in intimate mixture is dyed on the reel in known manner by one-bath process using 4 per cent of the weight of the fabric of a mixture of the copper compound of the azo-dyestuff obtainable by coupling aminoleuco Patent Blue with phenylmethylpyrazolone (see British Patent No. 104,743, Example 13) and Direct Green B (Schultz, Farbstofftabellen, 7th edition, vol. 1, No. 668) with the addition of 30 per cent of Glauber salt, the bath being neutral; the goods are then rinsed and drained by centrifuging or by suction. The fabric is then padded on the foulard with a solution containing 30 grams of a hydrophobic melamine-formaldehyde-condensation product soluble in water in the ratio of 1:1 (obtained from 1 mol melamine and 6 mols formaldehyde) and 10 grams of a formic acid of 85 per cent strength per litre; it is then suspended for 4 hours at a temperature of 40–50° C. There is obtained a dyeing of good fastness to water, washing, perspiration and rubbing.

Example 2

100 parts of mixed yarn consisting of 70 per cent wool and 30 per cent of viscose staple fiber are dyed neutral on a skein dyeing machine by a single bath process with 8 per cent of its weight of a mixture of Carbide Black E (Schultz, Farbstofftabellen, 7th edition, vol. 1, No. 671) and Cloth Fast Black B (loc. cit. No. 594) with the addition of 30 per cent Glauber salt. Having let off the dye bath and having been rinsed several times the yarn is now treated on the same machine for 5 minutes at room temperature with a solution containing 10 grams of the condensation product of Example 1 and 3 grams of formic acid of 85 per cent strength per litre. It is then centrifuged and dried for 1½ hours at 90° C. A dyeing fast to water and washing is obtained.

Example 3

A fancy fabric consisting of 50 per cent wool and 50 per cent cotton threads is dyed neutral on the reel with 5 per cent of its weight of Melantherine BH (Schultz, Farbstofftabellen, 7th edition, No. 393) and 1 per cent Cloth Fast Blue B (loc. cit. No. 552) with addition of 30 per cent Glauber salt, rinsed, centrifuged and impregnated on the foulard with a solution containing per litre 30 grams of a hydrophobic mixed condensation product soluble in water in a ratio of 1:1 (obtained from 1 mol urea, 1 mol melamine and 8 mols formaldehyde) and 10 grams of formic acid of 85 per cent strength; it is then dried. For improving the fixing of the resin, the fabric is treated in the Mather Platt apparatus for 5 minutes. This treatment with resin produces a good fastness to water, washing and perspiration.

Example 4

100 parts of mixed yarn consisting of 70 per cent wool and 30 per cent viscose staple fiber are dyed neutral by the single bath process on cross bobbins with a mixture of 2 per cent of its weight of Chlorantine Fast Red 6BL (Schultz, Farbstofftabellen, 7th edition, vol. 2, page 48) and 0.7 per cent of Cloth Fast Red B (loc. cit. page 222) in the presence of 20 per cent Glauber salt; the yarn is then well rinsed. The dyed yarn is after-treated with a solution containing per litre 30 grams of a hydrophobic condensation product soluble in water in a ratio of 1:3 (obtained from 1 mol melamine and 3 mols formaldehyde) and 10 grams of formic acid of 85 per cent strength, then centrifuged and without rinsing dried overnight at about 50° C. There is obtained a dyeing having good fastness to washing, water and perspiration.

Example 5

A viscose crepe fabric is dyed in known manner with 2 per cent of its weight of Cotton Yellow CH (Schultz, Farbstofftabellen, 7th edition, No. 726). After the dyeing the goods are rinsed, centrifuged or pressed and padded with a solution containing per litre 10 grams of a hydrophobic melamine-formaldehyde-condensation product (obtained from 1 mol melamine and 6 mols formaldehyde) soluble in cold water in a ratio of 1:1 and 4 grams of formic acid of 85 per cent strength. The fabric dried in the usual manner is now printed with a white discharge and a vat dyestuff, for instance Ciba Blue 2B (Schultz, Farbstofftabellen, 7th edition, No. 1314) in known two-color manner, then treated in the Mather Platt apparatus. For developing the discharge the goods are treated for 10 minutes in a bath containing 1 gram of Ultravon W and 1 cc. of formic acid per litre at 70° C. By this treatment with the melamine-formaldehyde-condensation product the fastness of the dyeing to the action of hot acid liquids is so far improved that the white discharge is not in the least colored by bleeding. If the proceeding is quite analogous but without the treatment with resin, the goods are damaged by bleeding of the ground and consequent discoloration of the whites.

*Example 6*

Cotton sateen is dyed in the usual manner with 3 per cent of its weight of Melantherine BH (Schultz, Farbstofftabellen, 7th edition, No. 93) and then padded with a solution containing per litre 30 grams of a hydroprobic dicyandiamide-formaldehyde-condensation product and 20 grams of formic acid of 85 per cent strength, dried and hardened for ½ minute at 130° C. The dyeing has very good fastness to water, washing and perspiration. The condensation product used is made by condensing 2 mols dicyandiamide with 3 mols of commercial formaldehyde until a sample becomes turbid when diluted with an equal volume of cold water; the solution is then evaporated in a vacuum until syrupy and after determination of its content of dry matter used for preparing the padding solution.

*Example 7*

Cotton sateen is dyed with 3 per cent of its weight of Chlorantine Fast Blue GLL (Schultz, Farbstofftabellen, 7th edition, Supplement I, page 78) and the dyeing is padded with or without intermediate drying with a solution containing per litre 5 grams of formic acid of 85 per cent strength and 35 grams of a hydrophobic urea-formaldehyde-condensation product, then dried and hardened for 4 minutes at 125° C. The dyeing thus obtained has good fastness to water, washing and perspiration. The hydrophobic urea-formaldehyde-condensation product is made by condensing 1 mol urea with 2 mols neutral aqueous formaldehyde solution until a sample yields a precipitate when diluted with 5 parts of cold water, whereupon the whole is evaporated in a vacuum and dried.

*Example 8*

The dyeing of Example 6 or a 3 per cent dyeing of Direct Yellow G (Schultz, Farbstofftabellen, 7th edition, No. 703) on the same material is padded with a solution of 4.5 per cent strength of a hydrophobic melamine-phenol-formaldehyde-condensation product in acetic acid of 40 per cent strength, then dried and hardened for ½ minute at 130° C. There is obtained a dyeing having good fastness to washing. Instead of using a condensation product in acetic acid solution one may use it in alkaline solution by dissolving it with an equal weight of caustic soda solution of 10 per cent strength and diluting with water to the desired concentration. Before being hardened the dyeing is treated with formic acid of 10 per cent strength which may be applied by padding or spraying. The condensation product used is made by condensing 1 mol melamine with 1 mol phenol and 2 mols formaldehyde in alkaline solution until separation into layers occurs on cooling a sample. When this condition has been attained the whole is cooled and the separated layer after determining its dry content is used for making the padding solution.

*Example 9*

A woolen fabric dyed with 3 per cent Neutral Blue B (Schultz, Farbstofftabellen, 7th edition, No. 248) is immersed in a solution containing per litre 35 grams of a hydrophobic melamine-formaldehyde-condensation product soluble in water in a ratio of 1:1 (obtained from 1 mol melamine and 6 mols formaldehyde) and 5 grams of formic acid of 85 per cent strength, then pressed and allowed to lie overnight in rolled up condition at room temperature. On the next day the goods are rinsed and dried. By this treatment the fastness to water and sea-water of the dyeing is considerably increased and the effect obtained remains after normal home laundry work. At the same time the tendency of the wool to felt in use and when washed is essentially diminished which is a further advantage.

What we claim is:

1. A process for improving the fastness of dyeings and prints by after-treatment with aldehyde condensation products which comprises subjecting the dyeings or prints to an aqueous solution containing a hydrophobic intermediate condensation product of formaldehyde and at least one substance selected from the group consisting of melamine, urea, thiourea guanidine, dicyandiamide, biuret and phenol, the concentration of said condensation product in said solution being below 5% calculated relative to the weight of the treating liquor.

2. A process for improving the fastness of dyeings and prints by after-treatment with a melamine-formaldehyde condensation product which comprises subjecting the dyeings or prints to an aqueous solution containing a hydrophobic intermediate condensation product of formaldehyde and melamine, the concentration of said condensation product in said solution being below 5% calculated relative to the weight of the treating liquor.

3. A process for improving the fastness of dyeings and prints by after-treatment with a urea-formaldehyde condensation product which comprises subjecting the dyeings or prints to an aqueous solution containing a hydrophobic intermediate condensation product of formaldehyde and urea, the concentration of said condensation product in said solution being below 5% calculated relative to the weight of the treating liquor.

GUSTAVE WIDMER.
ANDREAS RUPERTI.